(12) United States Patent
Foottit et al.

(10) Patent No.: US 7,937,300 B2
(45) Date of Patent: May 3, 2011

(54) SYSTEM AND METHOD FOR PROVIDING INTEROPERABILITY BETWEEN DIAMETER POLICY CONTROL AND CHARGING IN A 3GPP NETWORK

(75) Inventors: Tom A. Foottit, Stittsville (CA); Yong Li, Ottawa (CA); Mark Jones, Ottawa (CA)

(73) Assignee: Bridgewater Systems Corp., Ottawa, Ontario (CA)

( * ) Notice: Subject to any disclaimer, the term of this patent is extended or adjusted under 35 U.S.C. 154(b) by 196 days.

(21) Appl. No.: 12/171,019

(22) Filed: Jul. 10, 2008

(65) Prior Publication Data
US 2010/0010922 A1    Jan. 14, 2010

(51) Int. Cl.
*G07B 17/00* (2006.01)
(52) U.S. Cl. .......... 705/30; 705/400; 370/401; 455/436; 726/1
(58) Field of Classification Search ................ 705/30, 705/400; 370/401; 455/436; 726/1
See application file for complete search history.

(56) References Cited

U.S. PATENT DOCUMENTS

| | | | |
|---|---|---|---|
| 6,829,770 B1 | 12/2004 | Hinson et al. | |
| 7,191,180 B2 | 3/2007 | Evans et al. | |
| 2004/0019465 A1 | 1/2004 | Kerr et al. | |
| 2005/0076106 A1 | 4/2005 | Hummer | |
| 2005/0240520 A1 | 10/2005 | Stura et al. | |
| 2006/0072573 A1 | 4/2006 | Broberg et al. | |
| 2007/0033274 A1 | 2/2007 | Duan | |
| 2007/0123213 A1 | 5/2007 | Wu | |
| 2007/0174400 A1 | 7/2007 | Cai et al. | |
| 2007/0180490 A1 | 8/2007 | Renzi et al. | |
| 2007/0281699 A1* | 12/2007 | Rasanen | 455/436 |
| 2008/0046963 A1* | 2/2008 | Grayson et al. | 726/1 |
| 2008/0159313 A1* | 7/2008 | Rasanen | 370/401 |
| 2008/0229385 A1* | 9/2008 | Feder et al. | 726/1 |
| 2010/0017846 A1* | 1/2010 | Huang et al. | 726/1 |

FOREIGN PATENT DOCUMENTS

| | | |
|---|---|---|
| CN | 101119211 | 2/2008 |
| GB | 2 354 349 A | 3/2001 |
| WO | WO 2008/052455 A1 | 5/2008 |

OTHER PUBLICATIONS

3G Americas, QoS Interopability and Policy Management Recommendations, Dec. 2007, retrieved on Jan. 4, 2010 from http://www.3gamericas.org/documents/3GAmericas_QosPolicy_Dec19-07.pdf.

3GPP TS 29.214 V8.0.0, 3rd Generation Partnership Project, Technical Specification Group Core Network and Terminals; Policy and Charging Control over Rx reference point (Release 8), Mar. 2008, retrieved on Jan. 4, 2010 from http://www.quintillion.co.jp/3GPP/Specs/29214-800.pdf.

Written Opinion and International Search Report from the Canadian Patent Office for International Application No. PCT/IB2009/006537, dated Jan. 15, 2010, 7 pages.

(Continued)

*Primary Examiner* — Vanel Frenel
(74) *Attorney, Agent, or Firm* — Sterne, Kessler, Goldstein & Fox P.L.L.C.

(57) ABSTRACT

A system and method are described whereby interoperability is facilitated in a 3GPP network environment in combination with DIAMETER policy controls. Such interoperability enables updated policy rules to be fully communicated in on-line charging situations where quota expirations occur. This invention maintains centralized policy control in a 3GPP network with on-line charging.

17 Claims, 5 Drawing Sheets

OTHER PUBLICATIONS

Figure 1:
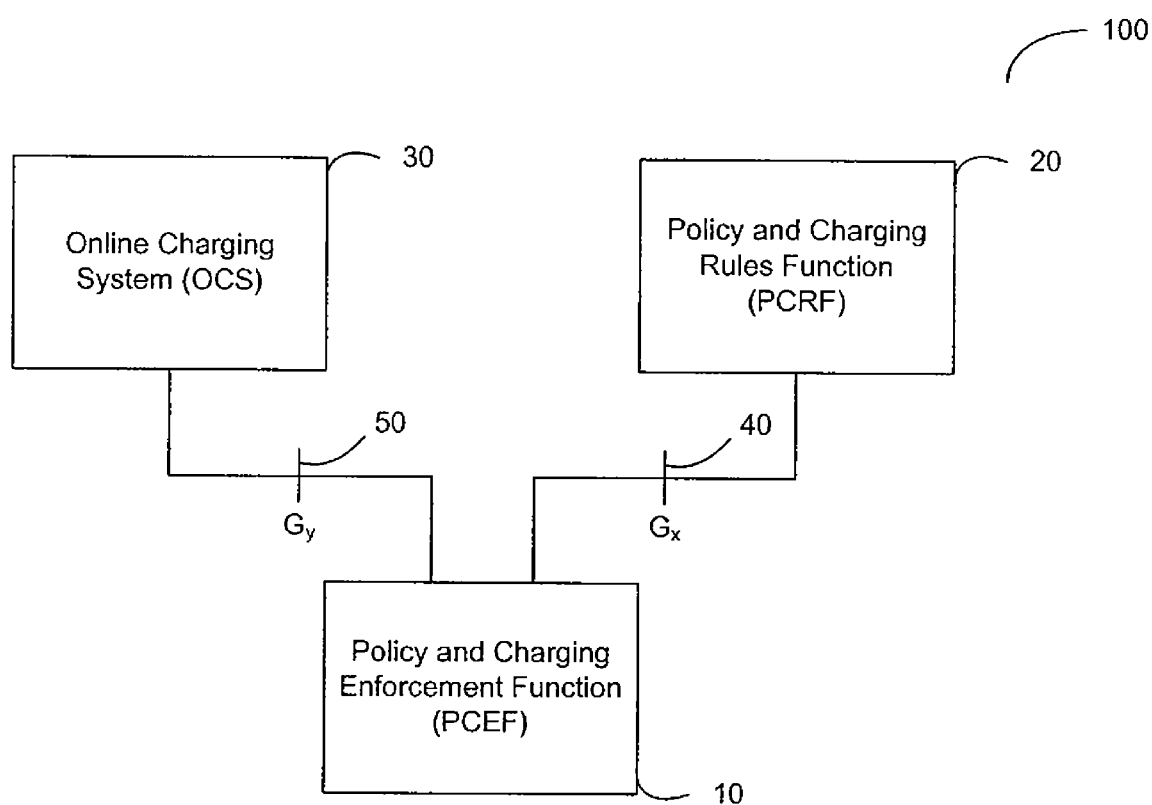

"3GPP2 X.S0013-012-0 Version 1 (Draft Version 0.14.0)—Appendix B Working Text on Information Flows for Flow Based Charging Control," 3rd Generation Partnership Project 2 (accessed Jun. 23, 2008).

3rd Generation Partnership Project; Technical Specification Group Services and System Aspects; Policy and charging control architecture (Release 7); 6.1.4: Event Triggers (Jun. 19, 2007).

3rd Generation Partnership Project; Technical Specification Group Services and System Aspects; Policy and charging control architecture (Release 8); 6.1.3: Credit Management and 6.1.4: Event Triggers (Jun. 9, 2007).

"Cisco SCMS SCE Subscriber API Programmer Guide Release 3.1; Chapter 3: API Events," http:/cio.cisco.com/univercd/cc/td/doc/product/cable/svc_ctrl/scmgtsu/scesubap/api_ev.pdf (May 2007).

Hagen et al., "Beyond the Black Box: Event-based Inter-Process Communication in Process Support Systems," *IEEE 19th International Conference on Distributed Computing Systems* (May-Jun. 1999).

Kueh et al., "Evolution of Policy Control and Charging (PCC) Architecture for 3GPP Evolved System Architecture," *IEEE 63rd Vehicular Technology Conference* (May 2006).

3rd Generation Partnership Project; Technical Specification Group Service and System Aspects; Telecommunication management; Charging management; Diameter charging applications (Release 7) TS 32.299 v7.7.0 (Sep. 2007).

3rd Generation Partnership Project; Technical Specification Group Services and System Aspects; Telecommunication management, Charging management; Charging architecture and principles (Release 7) TS 32.240 v7.2.0 (Mar. 2007).

3rd Generation Partnership Project; Technical Specification Group Core Network and Terminals; Policy and Charging Control over Gx reference point (Release 7) TS 29.212 v7.4.0 (Mar. 2008).

3rd Generation Partnership Project; Technical Specification Group Core Network and Terminals; Charging rule provisioning over Gx interface (Release 6) TS 29.210 v6.7.0 (Dec. 2006).

3rd Generation Partnership Project; Technical Specification Group Services and System Aspects; Policy and charging control architecture (Release 7) TS 23.203 v7.6.0 (Mar. 2008).

Internet Engineering Task Force; RFC4006—Diameter Credit-Control Application (Aug. 2005).

* cited by examiner

SYSTEM AND METHOD FOR PROVIDING INTEROPERABILITY BETWEEN DIAMETER POLICY CONTROL AND CHARGING IN A 3GPP NETWORK

BACKGROUND OF THE INVENTION

1. Field of the Invention

The present invention relates to charging in a 3GPP network, and more specifically to the provision of interoperability between Diameter policy control and charging in a 3GPP network.

2. Background Art

The Internet Protocol (IP) is the dominant communications protocol in the world today. Statistics reveal that over 15% of the world's population has access to the Internet, and recent growth rates reveal that this figure will continue to grow at an exponential rate. One of the chief virtues of the Internet is that it provides interoperability on a massive scale, and thereby permits communication between widely different devices. Such devices include not only desktop computers, but also portable computing devices, such as laptop computers, personal data assistants (PDAs), smart phones and the like.

Modern day usage has witnessed a substantial growth in the transmission of multimedia services over the Internet. That trend will continue as users expect access to personalized interactive, multimedia services, on any of the above devices, and at any location. Consequently, such expectations have driven telecommunications providers towards an "all IP" architecture for the provision of services.

In order to meet such requirements on network infrastructures, the IP Multimedia Subsystem (IMS) has been proposed. IMS details an architectural framework for the delivery of multimedia services to mobile users, using Internet protocols. IMS is specifically referenced in the 3rd Generation Partnership Project (3GPP), which serves to merge the Internet and mobile communications worlds. Therefore, to facilitate the integration of the mobile world with the Internet world, IMS adopts as many as are applicable of the Internet protocols.

In a 3GPP IMS network, the Policy and Charging Rules Function (PCRF) controls policy and charging rules over the Gx interface, while on-line charging is controlled over the Gy interface. In the context of on-line charging, the expiration of a quota for a subscriber leads to certain anomalies. For example, upon the expiration of a quota during a subscriber session, the Policy and Charging Enforcement Function (PCEF) will send a Gy credit charging request (CCR) to the Online Charging System (OCS) to request more quota. However, if there is no additional quota available, the OCS will respond with a Credit Control Application (CCA) indicating the absence of quota, as well as provide an indication via the Final-Unit-Action Attribute Value Pair (AVP) in the CCA as to what the PCEF should do with the subscriber's session. Three possible alternatives exist via the Final-Unit-Action AVP, namely termination of the Packet Data Protocol (PDP) context, redirection of the traffic over the context, or restricted access via supplied packet filters.

However, such an approach has two major drawbacks. Firstly, the OCS is limited in what it is permitted to return via the Gy interface in response to the quota expiration. Specifically, it is limited to the three options of terminate, redirect, and restrict access. In particular, it cannot deliver a complete Policy and Charging Control (PCC) charging rule (as would be supplied via the Gx interface). The second major drawback is that the PCRF is unaware of the changed policy that has been delivered by the OCS via the Gy interface. As such, the PCRF ceases to be a centralized policy control function since it is completely unaware that the OCS quota has been exceeded. Consequently, the PCRF may make incorrect or incomplete policy decisions as a result of its complete knowledge.

Traditionally, these drawbacks have been resolved by combining the Gx and the Gy interfaces together, and thereby merging the PCRF and the OCS functions in the architecture. Indeed, the 3GPP revision 6 specifically advocated such an approach. However, the conventional wisdom runs counter to the desires that the PCRF and OCS are intended to remain separate functions. Indeed, different vendors are often associated with each of the PCRF and the OCS functionalities. In fact, history reveals that there has not been a lot of co-operation between vendors of these two functionalities within the 3GPP architecture.

What is needed is a solution to the quota expiration scenario that preserves the independence of the OCS and the PCRF functionalities, such that the PCRF retains its centralized policy control and can return a new PCC charging rule.

BRIEF SUMMARY OF THE INVENTION

In a preferred embodiment of the present invention, the PCRF installs an event filter that indicates to the PCEF that the PCRF needs to be notified upon the occurrence of various OCS events. When a quota expires and an OCS event is triggered, the event filter will cause the PCEF to contact the PCRF for the appropriate policy decision and charging rule. In a further refinement of the present invention, the PCEF can notify the PCRF which of many possible quotas has been breached.

In a further embodiment of the present invention, the OCS can contact the PCRF directly in the event of a quota breach. Such an embodiment requires interoperability of the OCS and PCRF, which in turn requires co-operation between the different vendors offering such functionality in a 3GPP network.

Among other benefits, the various embodiments of the current invention allow centralized policy control in a 3GPP IMS network where on-line charging is used. Importantly, the various embodiments permit the PCRF and the OCS components to remain separate functions.

Importantly, benefits of various embodiments of the current invention find applicability to the current 3GPP Release 7, to the upcoming Release 8, as well as to future releases of the 3GPP specifications.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The present invention is described with reference to the accompanying drawings. In the drawings, like reference numbers indicate identical or functionally similar elements. The drawing in which an element first appears is indicated by the left-most digit in the corresponding reference number.

FIG. 1 provides a diagram showing the overall Policy Charging Control architecture in a 3GPP network.

Figure 2:
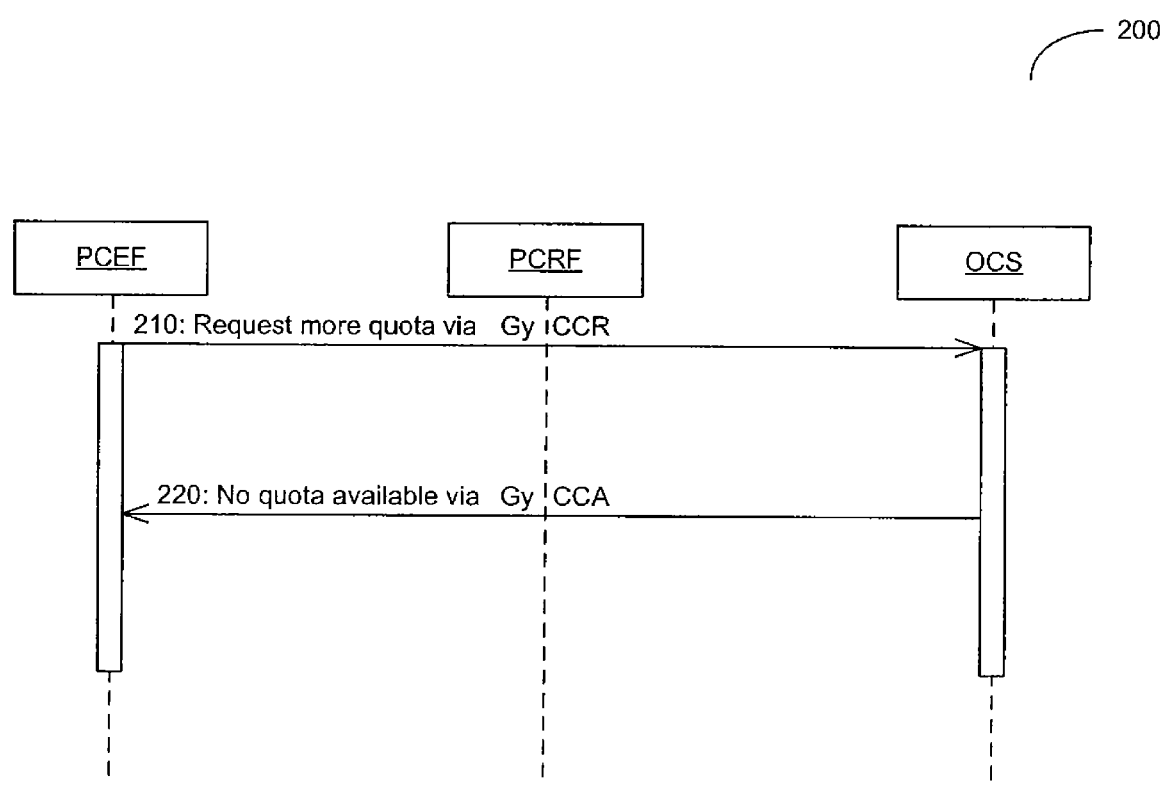

FIG. 2 provides a simplified flowchart illustrating the conventional approach to quota expiration in the context of online charging in a 3GPP network.

Figure 3:
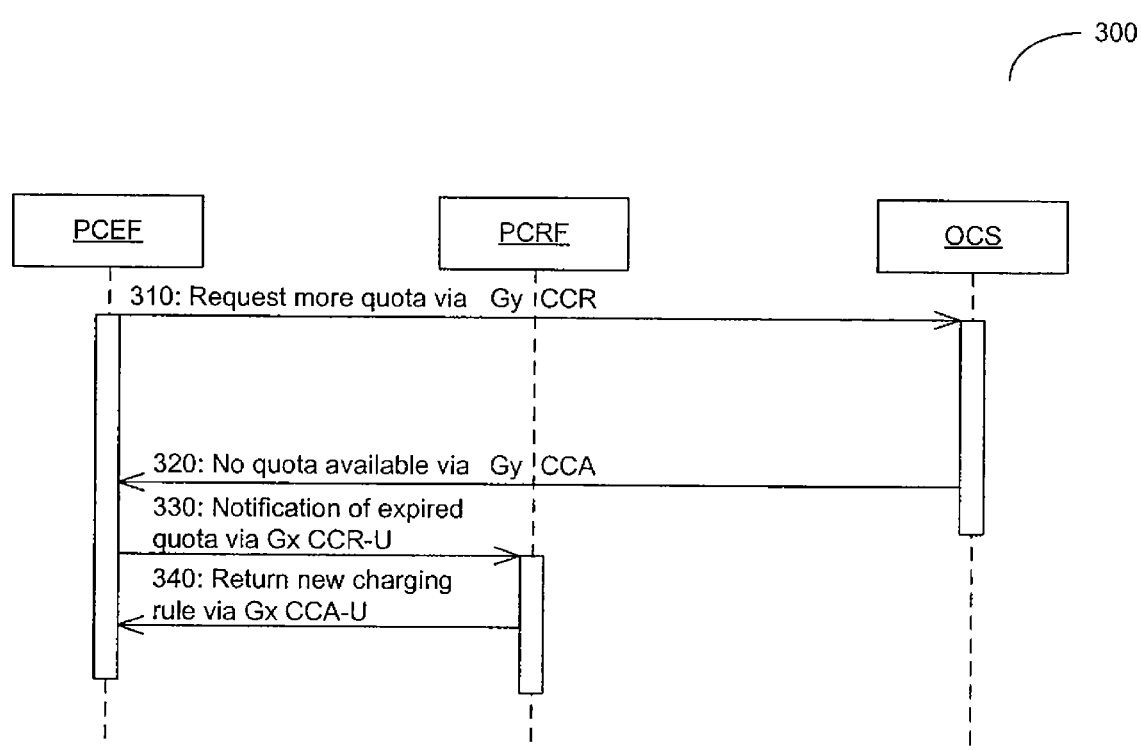

FIG. 3 provides an exemplary method for allowing the OCS to indicate to the PCEF via the Gy interface that the PCRF should be contacted (via Gx) when the quota is expired.

Figure 4:
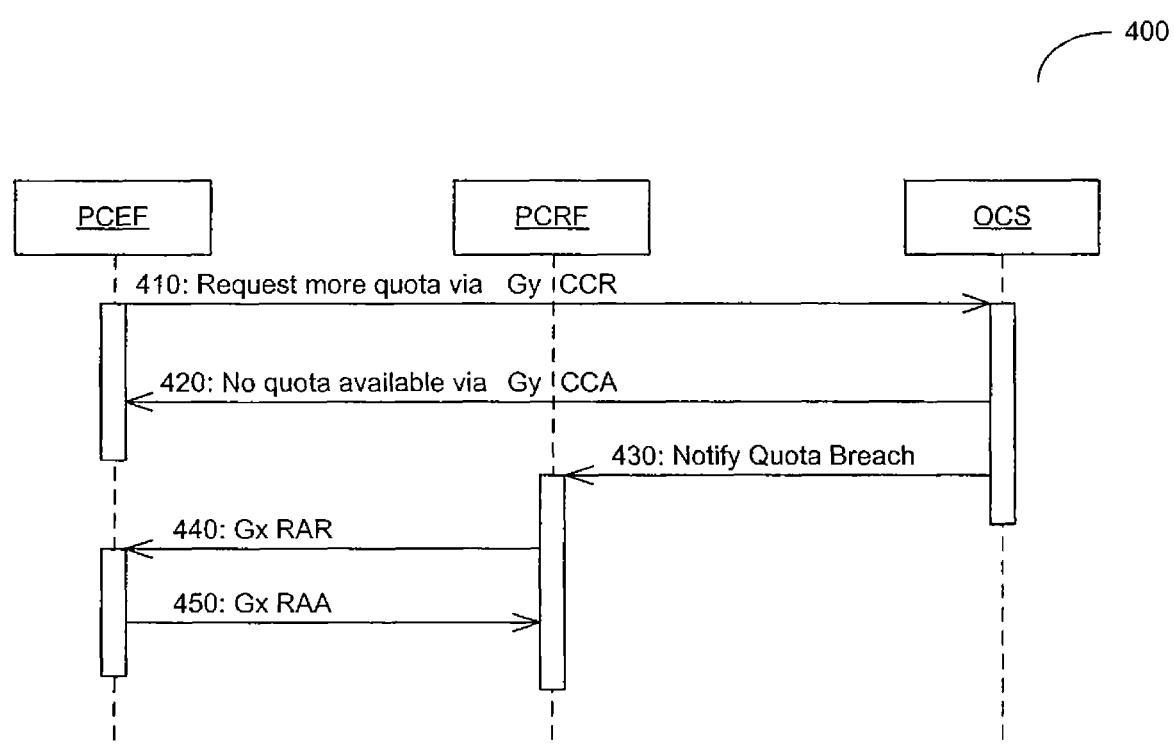

FIG. 4 provides an exemplary method for allowing the OCS to contact the PCRF directly when the quota is expired.

Figure 5:
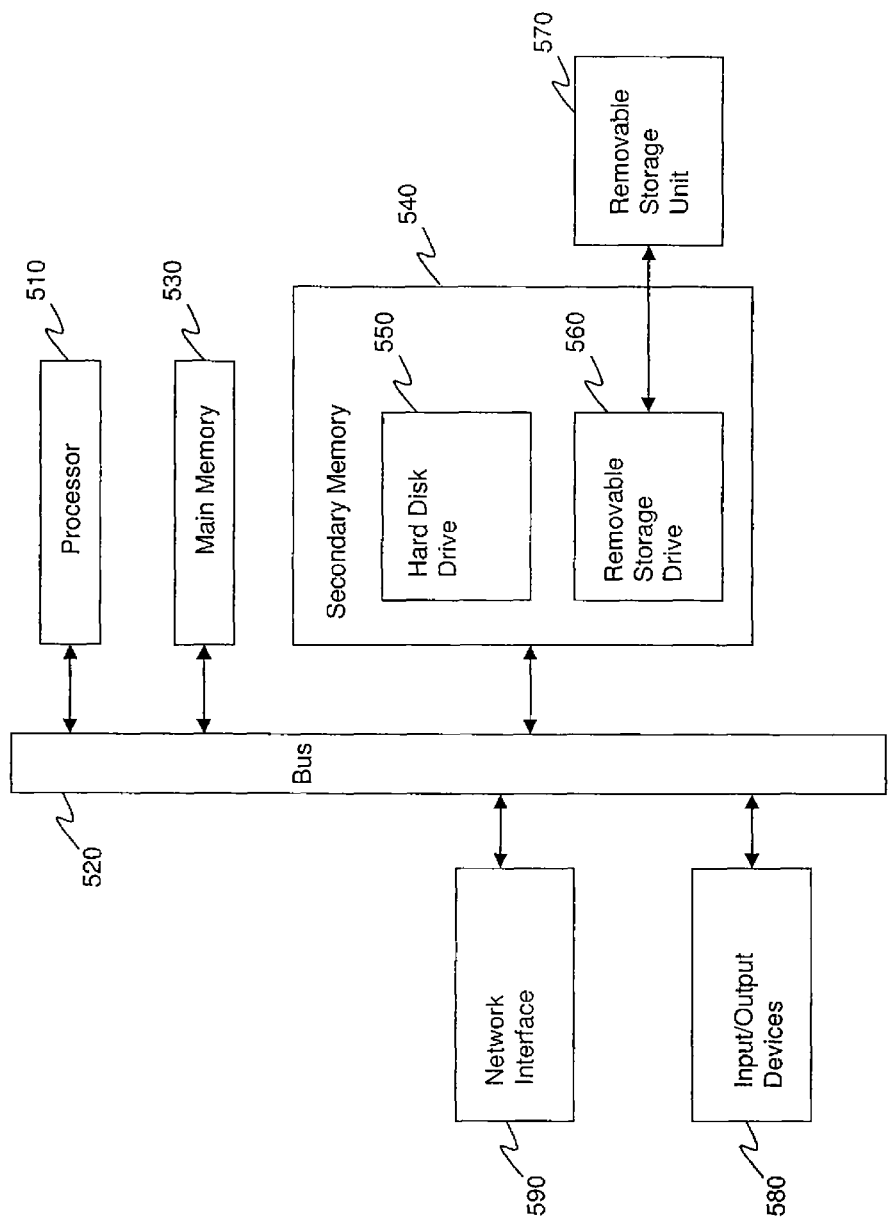

FIG. 5 is a diagram of a computer system on which the methods and systems herein described can be implemented, according to an embodiment of the invention.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In a 3GPP network, policy and charging control is accomplished via functionality that is composed of several functions, including the following: PCEF (Policy and Charging Enforcement Function), PCRF (Policy and Charging Rules Function), and the OCS (Online Charging System). FIG. 1 provides a diagram illustrating the overall Policy Charging Control architecture 100. Also shown are the PCEF 10, the PCRF 20, and the OCS 30. A Gx interface 40 is situated between the PCEF 10 and the PCRF 20. Similarly, a Gy interface 50 is situated between the OCS 30 and the PCEF 10.

The PCEF 10 functionality includes policy enforcement, service data flow detection, and flow based charging functionalities. The policy control indicated by the PCRF 20 is enforced by the PCEF 10. To that end, the PCEF 10 will permit the service data flow to pass through the PCEF 10 only if there is a corresponding active PCC rule and for online charging, the OCS 30 has authorized credit for the charging key. Ultimately, the PCEF enforcement unit ensures that the service is provided with the appropriate transmission quality (Quality of Service (QoS)), and that the subscriber is charged in accordance with the charging rate relevant to the particular subscriber.

The PCRF 20 functionality includes policy control and flow based charging control functionalities. Thus, the PCRF 20 authorizes QoS resources. Ultimately, the PCRF 20 resembles a collection controller in that it collects the subscriber's subscription data and for allowing the PCEF unit to enforce the policies and the charging.

The OCS 30 facilitates the online charging process whereby charging information for network resource usage is collected concurrently with that resource usage. Authorization for the initial usage must occur prior to the actual commencement of that usage—such authorization is approved by the OCS 30 upon request from the network. Such approval may be limited in terms of data volume or in terms of duration. In such cases as these limited approvals, resource usage authorizations must be renewed as actual resource usage demands.

FIG. 2 is a simplified flowchart 200 illustrating the conventional approach to quota expiration in the context of online charging in a 3GPP network. Not shown in this flowchart, during the PDP context establishment, the PCRF delivers a charging rule over the Gx interface that requires online charging. Also before the flowchart starts, the PCEF will contact the OCS over the Gy interface for a charging quota. At step 210, should the quota expire, mid-session, the PCEF will send a Gy CCR to the OCS to request more quota. At step 220, if there is no more quota available, the OCS will respond with a CCA indicating that there is no quota and will indicate via the Final-Unit-Action AVCP in the CCA what the PCEF should do with the subscriber's session. Per RFC 4006 section 8.35, the Final-Unit-Action can indicate termination of the PDP context, redirection of the traffic over the context or restricted access via supplied packet filters.

As noted earlier, this conventional approach limits the type of information available from the OCS during such a scenario in that it cannot deliver a complete PCC charging rule of the type supplied via the Gx interface by the PCRF. Moreover, the PCRF is no longer the centralized knowledge base of policy knowledge and, as such, incorrect or incomplete policy decisions may be made.

In one embodiment of the current invention, a method allows the OCS to indicate to the PCEF via the Gy interface that the PCRF should be contacted (via Gx) when the quota is expired so that the PCRF can make the policy determination and return a new PCC charging rule. When the PCEF first contacts the PCRF and gets a charging rule via Gx, the PCRF can install an event filter called OCS that indicates to the PCEF that it wishes to be contacted when OCS events occur.

Thus, an embodiment of the current invention proceeds as shown in FIG. 3. At step 310, the PCEF contacts the OCS with a Gy CCR when there is no remaining quota (as above). At step 320, the OCS can respond with a Final-Unit-Action AVP with a new value: CONTACT_PCRF. At step 330, if the PCEF receives a Gy CCA containing this AVP then it shall immediately contact the PCRF with a Gx CCR-U if the PCRF had installed the OCS event trigger. In the Gx CCR-U the PCEF will indicate the event that has occurred (OCS) and can also indicate which quota has been breached via additional AVP's. At step 340, the PCRF can then render a policy decision and return a new charging rule to the PCEF indicating what policy the PDP context should have because the quota is breached.

This invention could also be implemented by having the OCS contact the PCRF directly. This has the disadvantage of requiring the OCS and the PCRF to interoperate directly, but it does allow the PCRF to continue to be the central point of policy decisions. A sample call flow for this embodiment of the current invention is shown in FIG. 4. At step 410, the PCEF contacts the OCS with a Gy CCR when there is no remaining quota (as above). At step 420, the OCS would conventionally respond with an indication that no further quota is available. At step 430, the OCS would next notify the PCRF directly of a quota breach, using an appropriate interface. At step 440, the PCRF would notify the PCEF via a Gx Re-Auth-Request (RAR) of the new charging rule. Finally, at step 450, the PCEF acknowledges the receipt of a new charging rule from the PCRF via a Gx Re-Auth-Answer (RAA).

The precise details used by the OCS to contact the PCRF (step 430 in FIG. 4) is not specified, but it could be any number of interfaces or protocols, including a 3GPP DIAMETER Rx or a proprietary interface.

This invention allows centralized control of policy in a 3GPP IMS network where on-line charging is used. This allows a PCRF and OCS to co-operate in solving important carrier use-cases around time and volume-based metering and charging.

Computer System Implementation

In an embodiment of the present invention, the methods and systems of the present invention described herein are implemented using well known computers, such as a computer 500 shown in FIG. 5. The computer 500 can be any commercially available and well known computer capable of performing the functions described herein, such as computers available from International Business Machines, Apple, Sun, HP, Dell, Cray, etc.

Computer 500 includes one or more processors (also called central processing units, or CPUs), such as processor 510. Processor 510 is connected to communication bus 520. Computer 500 also includes a main or primary memory 530, preferably random access memory (RAM). Primary memory 530 has stored therein control logic (computer software), and data.

Computer 500 may also include one or more secondary storage devices 540. Secondary storage devices 540 include, for example, hard disk drive 550 and/or removable storage device or drive 560. Removable storage drive 560 represents a floppy disk drive, a magnetic tape drive, a compact disk drive, an optical storage device, tape backup, ZIP drive, JAZZ drive, etc.

Removable storage drive 560 interacts with removable storage unit 570. As will be appreciated, removable storage unit 560 includes a computer usable or readable storage medium having stored therein computer software (control logic) and/or data. Removable storage drive 560 reads from and/or writes to the removable storage unit 570 in a well known manner.

Removable storage unit 570, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 500, or multiple computer 400s to perform any combination of the functions described herein Computer programs (also called computer control logic) are stored in main memory 530 and/or the secondary storage devices 540. Such computer programs, when executed, direct computer 500 to perform the functions of the present invention as discussed herein. In particular, the computer programs, when executed, enable processor 510 to perform the functions of the present invention. Accordingly, such computer programs represent controllers of the computer 500.

Computer 500 also includes input/output/display devices 580, such as monitors, keyboards, pointing devices, etc.

Computer 500 further includes a communication or network interface 590.

Network interface 590 enables computer 500 to communicate with remote devices. For example, network interface 590 allows computer 500 to communicate over communication networks, such as LANs, WANs, the Internet, etc. Network interface 590 may interface with remote sites or networks via wired or wireless connections. Computer 500 receives data and/or computer programs via network interface 590. The electrical/magnetic signals having contained therein data and/or computer programs received or transmitted by the computer 500 via interface 590 also represent computer program product(s).

The invention can work with software, hardware, and operating system implementations other than those described herein. Any software, hardware, and operating system implementations suitable for performing the functions described herein can be used.

As noted earlier, benefits of various embodiments of the current invention find applicability to the current 3GPP Release 7, to the upcoming Release 8, as well as to future releases of the 3GPP specifications.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A system, comprising:
    a policy and charging enforcement function (PCEF) system;
    an on-line charging system (OCS) coupled to the PCEF system via a Gy interface; and
    a policy and charging rules function (PCRF) system coupled to said PCEF system via a Gx interface, wherein said PCRF system includes the ability to install in said PCEF system a filter that is configured to cause said PCEF system to contact said PCRF system upon an occurrence of an OCS event.

2. The system of claim 1, wherein the OCS event includes a breach of a quota.

3. The system of claim 2, wherein the filter is further configured to communicate the identity of the quota breached.

4. The system of claim 1, wherein said PCRF system renders a policy decision in response to the contact from the PCEF system.

5. The system of claim 1, wherein said PCRF system returns a new charging rule to the PCEF system in response to the contact from the PCEF system.

6. A method, comprising:
    installing a filter by a policy and charging rule function (PCRF) system into a policy and charging enforcement function (PCEF) system, wherein the filter is configured to cause the PCEF system to contact the PCRF system upon an occurrence of an OCS event.

7. The method of claim 6, wherein the OCS event includes a breach of a quota.

8. The method of claim 7, wherein the filter is further configured to communicate the identity of the quota breached.

9. A method, comprising:
   notifying an online charging system (OCS) by a policy and charging enforcement function (PCEF) system of a request for more quota;
   notifying the PCEF system by the OCS system of a quota breach;
   notifying a PCRF system by the PCEF system of the quota breach; and
   returning to the PCEF system by the PCRF system a policy decision.

10. The method of claim 9, wherein the returning a policy decision includes returning a new charging rule.

11. The method of claim 9, wherein the notifying includes communicating the identity of the quota breached.

12. A method, comprising:
    notifying an online charging system (OCS) by a policy and charging enforcement function (PCEF) system of a request for more quota;
    notifying the PCEF system by the OCS system of a quota breach;
    notifying a PCRF system by the OCS system of the quota breach;
    forwarding to the PCEF system by the PCRF system of a policy decision; and
    acknowledging to the PCRF system by the PCEF system of the policy decision.

13. The method of claim 12, wherein the forwarding a policy decision includes forwarding a new charging rule.

14. The method of claim 12, wherein the notifying includes communicating the identity of the quota breached.

15. The method of claim 12, wherein the notifying the PCRF system includes using one of a 3GPP DIAMETER Rx interface and a proprietary interface.

16. A computer-readable medium containing instructions for controlling at least one processor by a method, comprising:
    notifying an online charging system (OCS) by a policy and charging enforcement function (PCEF) system of a request for more quota;
    notifying the PCEF system by the OCS system of a quota breach;
    notifying a PCRF system by the PCEF system of an expired quota; and
    returning to the PCEF system by the PCRF system a policy decision.

17. A computer-readable medium containing instructions for controlling at least one processor by a method, comprising:
    notifying an online charging system (OCS) by a policy and charging enforcement function (PCEF) system of a request for more quota;
    notifying the PCEF system by the OCS system of a quota breach;
    notifying a PCRF system by the OCS system of the quota breach;
    forwarding to the PCEF system by the PCRF system of a policy decision; and
    acknowledging to the PCRF system by the PCEF system of the policy decision.

* * * * *